United States Patent [19]
Hanson

[11] Patent Number: 6,029,062
[45] Date of Patent: Feb. 22, 2000

[54] PREPAY TELECOMMUNICATIONS SYSTEM WITH UNREGISTERED ROAMING CALL PROCESSING

[75] Inventor: Daniel A. Hanson, Dallas, Tex.

[73] Assignee: National Telemanagement Corporation, Dallas, Tex.

[21] Appl. No.: 08/897,507

[22] Filed: Jul. 21, 1997

Related U.S. Application Data

[63] Continuation-in-part of application No. 08/794,463, Feb. 4, 1997.

[51] Int. Cl.[7] .......................... H04M 11/00; H04M 15/00
[52] U.S. Cl. ............................................. 455/408; 379/144
[58] Field of Search ..................................... 455/406, 407, 455/408, 432; 379/114, 115, 121, 127, 144

[56] References Cited

U.S. PATENT DOCUMENTS

| | | | |
|---|---|---|---|
| 4,706,275 | 11/1987 | Kamil | 379/144 |
| 4,930,150 | 5/1990 | Katz | 379/93 |
| 5,220,593 | 6/1993 | Zicker et al. | 379/59 |
| 5,291,543 | 3/1994 | Freese et al. | 455/408 |
| 5,345,498 | 9/1994 | Mauger | 379/58 |
| 5,353,335 | 10/1994 | D'Urso et al. | 379/67 |
| 5,412,726 | 5/1995 | Nevoux et al. | 380/24 |
| 5,438,615 | 8/1995 | Moen | 379/144 |
| 5,440,108 | 8/1995 | Tran et al. | 235/381 |
| 5,440,621 | 8/1995 | Castro | 379/112 |
| 5,450,938 | 9/1995 | Rademacher | 194/206 |
| 5,500,514 | 3/1996 | Veeneman et al. | 235/381 |
| 5,546,446 | 8/1996 | Tsunokawa et al. | 379/114 |
| 5,577,100 | 11/1996 | McGregor et al. | 379/58 |
| 5,577,109 | 11/1996 | Stimson et al. | 379/112 |
| 5,583,918 | 12/1996 | Nakagawa | 379/61 |

(List continued on next page.)

FOREIGN PATENT DOCUMENTS

| | | |
|---|---|---|
| 0 698 987 A2 | 2/1996 | European Pat. Off. . |
| WO 95/28062 | 10/1995 | WIPO . |
| WO 95/34161 | 12/1995 | WIPO . |
| WO 96/15633 | 5/1996 | WIPO . |
| WO 96/36192 | 11/1996 | WIPO . |

OTHER PUBLICATIONS

"Other prepaid billing systems could match our. But they'd have to clone our number", Advertisement released by Subscriber Computer, Inc.

Freeman, Susan, "Are prepaid applications "on the fringe" or infringing?", Intele–Card News, pp. 32–36, Jan./Feb. 1996.

Luna, Lynnette, "National Telemanagement answers prepaid wireless dilemmas", *RCR The Weekly Newspaper for the Wireless Industry*, Dec. 16, 1996.

"Automatic Prepaid Roaming Using the NTC Network", released by National Telemanagement Corporation.

*Primary Examiner*—Paul Loomis
*Attorney, Agent, or Firm*—Baker & Botts, L.L.P.

[57] ABSTRACT

The prepay telecommunications system (60) includes a prepay call management platform (50) which is directly coupled to a telecommunications carrier switch (24). A customer database (116) is coupled to the prepay call management platform (50) for storing prepay customer data, and a plurality of customer interface facilities (62, 64, 66, 68, 80) are provided for accepting customer prepayment and immediately updating the customer database (116). An unregistered roaming call is recognized by the mobile identification number and is routed to the prepay call management platform (50) coupled to and co-located with the telecommunications carrier switch (24) for processing. The caller is prompted for a payment option which may include payment by credit card or a collect call. The caller is then prompted for a credit card number if the credit card option is selected. The credit card number may be validated and verified by a credit card verification processor (128) coupled to prepay call management platform (50). The prepay call is then released to the telecommunications carrier switch (24) for line termination.

19 Claims, 5 Drawing Sheets

U.S. PATENT DOCUMENTS

| | | | |
|---|---|---|---|
| 5,592,535 | 1/1997 | Klotz | 379/58 |
| 5,621,787 | 4/1997 | McKoy et al. | 379/144 |
| 5,621,796 | 4/1997 | Davis et al. | 380/24 |
| 5,719,926 | 2/1998 | Hill | 379/113 |
| 5,721,768 | 2/1998 | Stimson et al. | 379/114 |
| 5,722,067 | 2/1998 | Fougnies et al. | 455/406 |
| 5,732,136 | 3/1998 | Murphree et al. | 380/24 |
| 5,778,313 | 7/1998 | Fougnies | 455/406 |
| 5,826,185 | 10/1998 | Wise et al. | 455/405 |
| 5,850,599 | 12/1998 | Seiderman | 455/406 |
| 5,854,975 | 12/1998 | Fougnies | 455/406 |

PREPAY TELECOMMUNICATIONS SYSTEM WITH UNREGISTERED ROAMING CALL PROCESSING

CROSS-REFERENCE TO RELATED APPLICATION

This application is a continuation-in-part application of U.S. patent application Ser. No. 08/794,463, filed Feb. 4, 1997.

TECHNICAL FIELD OF THE INVENTION

This invention is related in general to the field of telecommunications. More particularly, the invention is related to a prepay telecommunications system with unregistered roaming call processing.

BACKGROUND OF THE INVENTION

The world of wireless telecommunications is entering a new era with the advent of personal communications services (PCS). The constant trend toward lower and lower subscriber acquisition costs and higher market penetration is creating a demand for more effective ways to offer the wireless service to broader segments of the population. However, a large percentage of applicants are normally turned away from wireless carriers due to poor or insufficient credit, although many of these applicants do possess the ability to pay for the service. Accordingly, a growing segment within the wireless telecommunications market is the prepaid wireless service.

The typical wireless service requires its subscriber caller to deposit a certain amount of funds, by cash, credit card, and/or other means, into an account. As the caller uses the wireless service, the account balance is deducted. As long as there are funds in the account, the caller may continue to use the wireless service. Additional deposits may be made to replenish the account balance.

There are however, several disadvantages associated with traditional prepaid wireless accounts. First, the caller may be required to enter an additional authorization code or personal identification number (PIN) in order to place each call. Some debit cards or debit systems may require the customer to enter as many as 31 additional digits. Second, the traditional prepaid wireless services lack the ability to disconnect a call during the call when the account balance is fully depleted. Third, there is substantial lag time between the time of the call and the time the amount of funds expended by a call is posted to the account. Therefore, it may be seen that the wireless service provider experiences credit exposure with post call billing and the inability to disconnect calls as soon as the accounts are depleted of funds. While these problems are most acute in the wireless industry, they are also a problem in other telecommunications systems.

Further, if an incoming call is recognized as an unregistered roaming call, the cellular switch typically routes the call to an 1-800 number which then prompts the caller to provide an alternative form of payment, such as by credit card. The unregistered roaming call is thus processed off-site. A disadvantage of the conventional method is that the off-site processor does not have the caller's identity such as the customer group office code (NPA-NXX) or mobile identification number (MIN) to perform certain verification and fraud detection tasks. Further, the caller is required to reenter the called party's telephone number.

SUMMARY OF THE INVENTION

Accordingly, there is a need for a prepay telecommunications system that is transparent to its user except to pay in advance for the services. Further, there is a need to be able to monitor the call in real-time in order to disconnect calls as soon as funds are depleted in the account. In addition, it is desirable to process unregistered roaming calls on-site so that the caller's customer group office code and the called party's telephone number are available without requiring the caller to reenter the information.

In accordance with the present invention, a prepay telecommunications system with live call management is provided which eliminates or substantially reduces the disadvantages associated with prior prepay services.

In one aspect of the invention, a prepay telecommunications system includes a prepay call management platform which is directly coupled and co-located with a telecommunications carrier switch. The system further includes a customer database coupled to the prepay call management platform for storing prepay customer data.

In another aspect of the invention, a prepay telecommunications system includes a prepay call management platform which is directly coupled and co-located with a telecommunications carrier switch, and a customer database coupled to the prepay call management platform for storing prepay customer data. Further provided is a credit card verification processor coupled to the prepay call management platform.

In yet another aspect of the invention, a method for live call management of a prepay call with unregistered roaming call processing is provided. The method includes the steps of recognizing an unregistered roaming call at a telecommunications carrier switch, routing the unregistered roaming call to a prepay call management platform coupled to the telecommunications carrier switch, announcing payment options and prompting for a selection, and verifying the validity of the payment option. If the payment option is valid, then the call is released to the telecommunications carrier switch for line termination.

A technical advantage of the prepay wireless telecommunications system of the present invention is the ease of use since callers do not need to remember or dial any authorization codes or personal identification numbers. Further, customer accounts are immediately updated to reflect any replenishing transactions or funds expended by calls. Most importantly, by offering the prepay services of the present invention, the telecommunications carrier does not experience unnecessary credit exposure due to depleted funds or fraud.

Yet another technical advantage of the present invention is that unregistered roaming calls are processed on-site with the attendant benefits of processing speed, not requiring the caller to reenter information, and the ability to perform fraudulent use checks on credit cards.

BRIEF DESCRIPTION OF THE DRAWINGS

For a better understanding of the present invention, reference may be made to the accompanying drawings, in which.

DETAILED DESCRIPTION OF THE INVENTION

Figure 1:
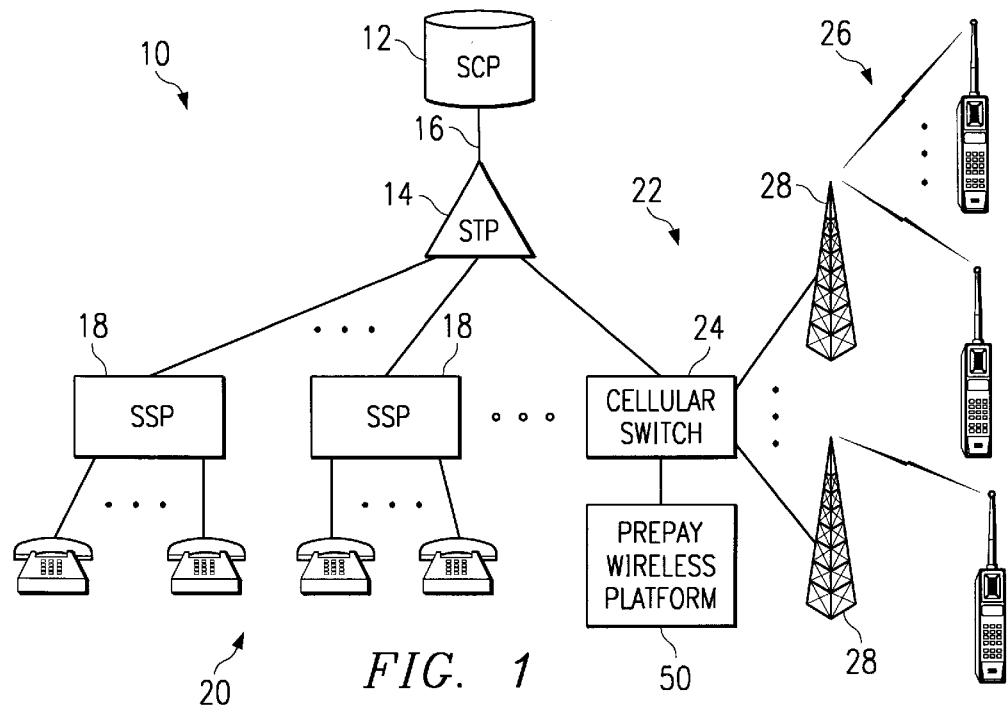
FIG. 1 is a block diagram of an exemplary telecommunications network according to the teachings of the present invention.

The preferred embodiment(s) of the present invention is (are) illustrated in FIGS. 1–6, like reference numerals being used to refer to like and corresponding parts of the various drawings.

Referring to FIG. 1, a block diagram of an exemplary telecommunications network 10 according to the teachings of the present invention is shown. Telecommunications network 10 is preferably constructed pursuant to the Advanced Intelligent Network (AIN) architecture 10. Telecommunications network 10 includes a service control point (SCP) 12 coupled to a signal transfer point (STP) 14 through a signaling system no. 7 (SS7) link set 16 specified by the Consultative Committee on International Telephone and Telegraph (CCITT). An SS7 link set may include up to sixteen 56 Kb/s links. STP 14 is in turn coupled to one or more service switching points (SSP) 18 also via SS7 link sets. SSPs 18 connect telephone service customers 20 to the telecommunications network.

A wireless telephone system 22 is further coupled to STP 14 to provide wireless telecommunications services to wireless service customers 26. Wireless telephone system 22 may include a wireless or cellular switch residing in a mobile telecommunications switching office (MTSO) 24. Wireless telephone system 22 encompassing one or more MTSO 24 may include a number of land-based transmission towers 28 and/or satellite-based wireless transponders (not shown). Calls may originate from a non-wireless telephone customer 20 to another non-wireless telephone customer 20, from a wireless telephone customer 26 to another wireless telephone customer 26, from a non-wireless telephone customer 20 to a wireless telephone customer 26, and vice versa. According to the teachings of the present invention, a prepay wireless platform 50 is coupled to cellular switch 24 to provide live call management therefor. Prepay wireless platform 50 may also be hereinafter referred to as a prepay call management platform 50. Preferably, prepay wireless platform 50 is co-located with cellular switch 24 or located on-site with cellular switch 24. The communications span between cellular switch 24 and prepay wireless platform 50 may be a T1 line, an SS7 link set, or any other suitable medium according to any other suitable communications protocol.

It is important to note that prepay call management platform 50 may also be coupled to SSP 18 to provide prepay live call management to non-wireless telecommunications systems in a similar manner. Although the detailed description below is directed toward applications to a wireless telecommunications system, the discussion is equally applicable to a non-wireless telecommunications system.

Figure 2:
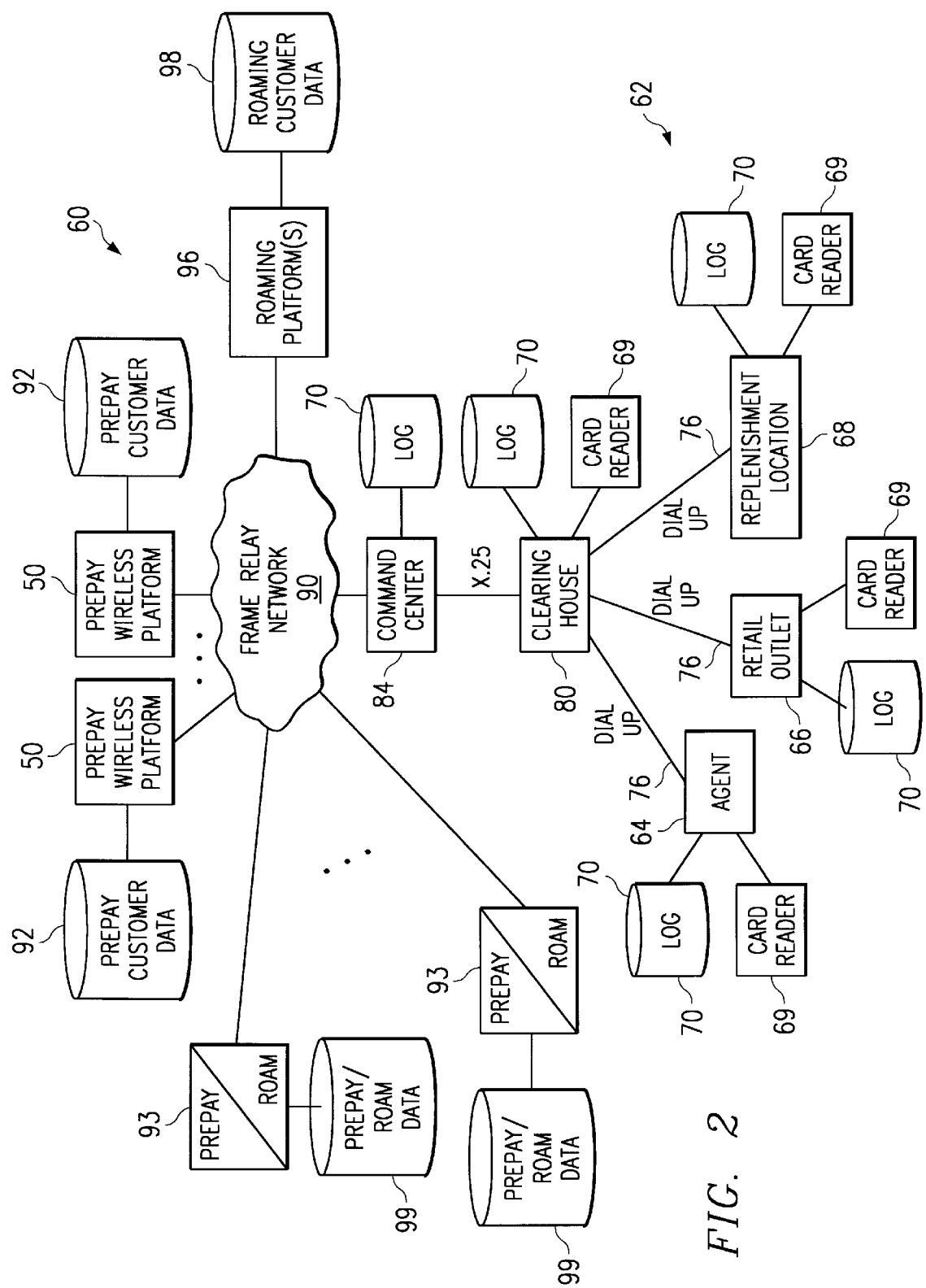
FIG. 2 is a block diagram of an exemplary prepay wireless telecommunications architecture according to the teachings of the present invention.

FIG. 2 is a block diagram of an exemplary prepay wireless telecommunications architecture 60 according to the teachings of the present invention. A number of customer interface facilities 62, such as authorized sales agents 64, retail outlets 66, and replenishing locations 68 are employed to provide a network of convenient access points to the customers. Card readers 69 may be employed at customer interface facilities 62 to read customer data stored in a deposit card issued to each prepay customer. A log 70 of customer information is kept at each respective customer interface facility 62 to record the customer names, account numbers, and the transaction amounts.

The customers may activate prepay wireless service and replenish their accounts at any of these customer interface facilities 62. Further, customer interface facilities 62 may also include a clearinghouse network 80 which includes a large number of nationwide or global retail locations, such as the Travelers Express™, that may also be used to replenish prepay wireless accounts. Clearinghouse 80 may further maintain a log 70 of its customer information. Authorized sales agents 64, retail outlets 66, and replenishing locations 68 may have dial-up connections to clearinghouse network 80, which may be coupled to a command center 84 through a packet switching X.25 span specified by the CCITT, for example.

Clearinghouse 80 may further be coupled to an optional command center 84 via an X.25 link, for example. Command center 84 may serve to oversee the operations of prepay wireless telecommunications service and as an interface between customer interface units 62 and clearinghouse 80 to prepay wireless platforms 50. A log 70 of customer information may also be maintained at command center 84.

Command center 84 preferably communicates with one or more prepay wireless platforms 50 via a frame relay network or wide area network 90. Each wireless platform 50 maintains a database 92 of its customers. Prepay wireless platforms 50 may further communicate with one another and to one or more roaming platforms 96 via frame relay network 90. Each roaming platform 96 preferably maintains a roaming customer database 98. At other sites or cities, co-located prepay and roam wireless platforms 93 may serve the local wireless subscriber community. Databases 99 storing customer data related to prepay accounts and roaming capabilities are coupled to each prepay/roam platform 93. Prepay/roam platforms 93 may communicate with one another and with prepay wireless platforms 50 and roaming platforms 96 via frame relay network 90. As each customer activates a prepay wireless account, he/she is assigned a primary or home prepay wireless platform 50, where data associated with the customer's prepay account is stored.

In operation, cash, bank drafts, credit cards, and telephone company billing may be used to replenish the prepay wireless account at any customer interface facility 62. A deposit card (not shown) which has a magnetic strip, embedded chip, or another storage medium recording the customer's name and account number may be issued to each customer. Customer interface facilities 62 preferably employ data card readers 69 to obtain the information stored in the customer's deposit card and to immediately relay this information and the transaction amount to the customer's home prepay wireless platform 50. The transaction amount is then immediately posted to the customer's account to reflect the new balance. This transaction is similar to a credit card or debit card transaction at a point of sale (POS). If authorized, the customer may also dial a pre-assigned code with the wireless telephone to replenish his/her account with a credit card. Constructed in this manner, the customer may immediately begin to use the wireless services.

Figure 3:
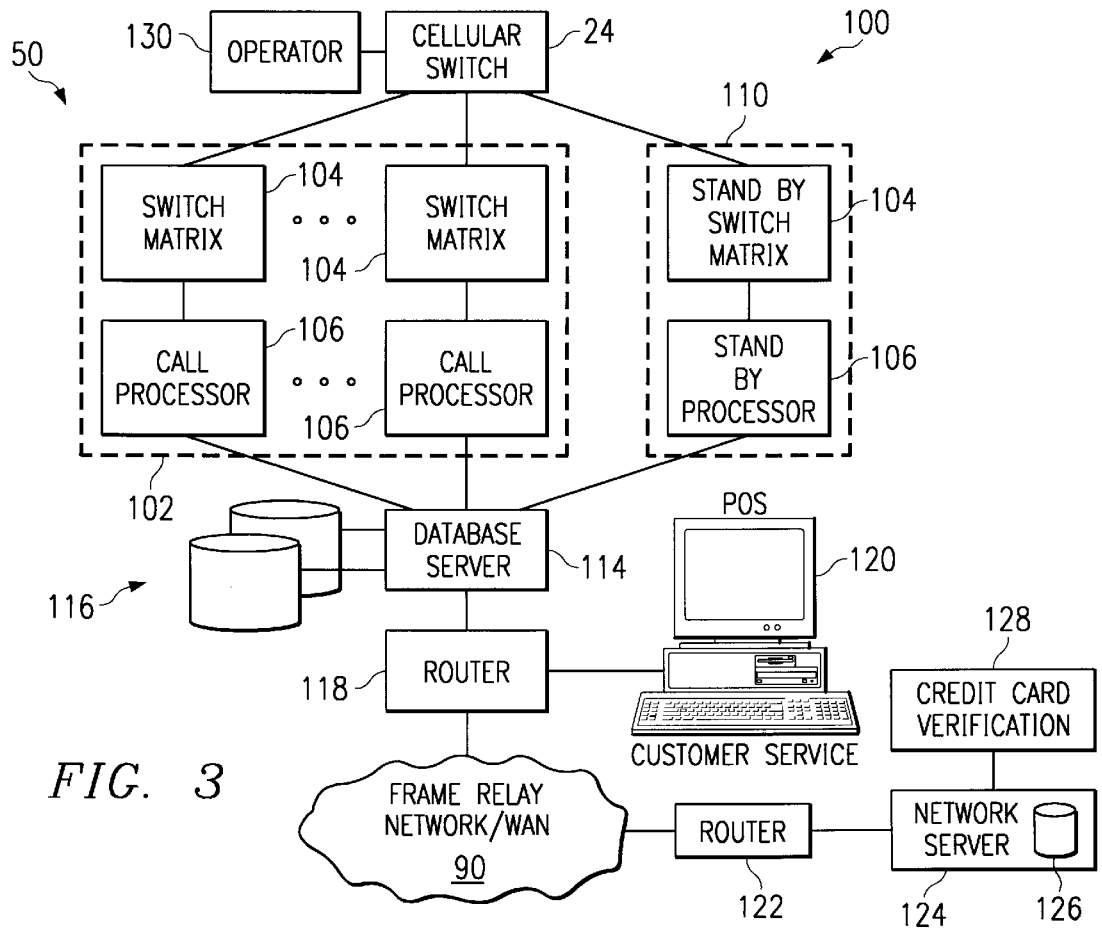
FIG. 3 is a block diagram of an exemplary prepay wireless platform according to the teachings of the present invention.

FIG. 3 is a block diagram of an exemplary prepay wireless platform 50 according to the teachings of the present invention. Prepay wireless platform 50 includes a primary call manager unit 102 and an optional backup call manager unit 110. Primary call manager unit 102 may include one or more switch matrices 104, each being coupled to a respective call processor 106. Call processors 106 provide voice prompts and announcements, account balance computations, call progress monitoring, and call blocking. Automatic voice announcements may be programmed to provide the customer the remaining balance in the prepay account at the beginning of a call and reminders to replenish accounts prior to call termination when a preset minimum is reached. If desired, multi-lingual voice announcements may be configured to meet the customer's preference.

Backup call manager 110 may be similarly constructed with one or more standby switch matrices 104 and a standby processor 106. The number of standby switch matrices and standby call processors is dependent on the level of redundancy required, which may be 1:1, 2:1, 3:1, etc. Switch matrices 104 may be implemented with Nortel™ Meridian™ switches and other switches of similar operational characteristics and functionality.

It may be seen that primary and standby call manager units 102 and 110 may be implemented by only a computing processor if prepay wireless platform 50 is more highly integrated with the carrier's switch 24, so that the functionality of switch matrix 104 is carried out thereby. Primary and standby call manager units 102 and 110 are preferably co-located with cellular switch 24 and are coupled thereto via a T1, SS7, or any other suitable link. In one embodiment, the functionality of switch matrices 104 are carried out by cellular switch 24, so that cellular switch 24 may be directly coupled to call processors 106. Call processors 106 are further coupled to a database server 114, which maintains a pair of mirrored databases 116 to provide redundancy and ensure the integrity of the data. Database server 114 and call processors 106 may be implemented by any processor unit with adequate processing capacity and speed, and may be a personal computer, a workstation, a mini-computer, or the like. Database server 114 is further coupled to a router 118 which provides data and message routing functions between prepay wireless platform so and customer service/system administration/POS terminals 120 via a local area network (LAN), and to customer interface facilities 62 (FIG. 2) via a frame relay network or wide area network (WAN) 90.

Router 118 may further be coupled to a second router 122 via network 90. Router 122 is coupled to a server 124 via a communications link such as a local area network, and server 124 is further coupled to a processor 128 of a credit card verification company via an X.25 link, for example. An operator 130 may be coupled to cellular switch 24 for further processing when the caller requires assistance.

In operation, prepay wireless platform 50 may accept dual-tone multifrequency (DTMF), multifrequency (MF), or primate rate addressing protocols from cellular switch 24. When cellular switch 24 recognizes a prepay wireless customer by the mobile identification number (MIN), cellular switch 24 transfers the call to prepay wireless platform 50 for account balance verification, individual account processing requests, and then routes the call back to the cellular carrier for call completion. However, if there is insufficient funds in the caller's account, the call is not completed except calls for emergency 911 or customer service, for example. If a caller's account balance is exhausted while in the middle of a call, the call is disconnected immediately.

Because prepay wireless platform 50 is directly coupled to the cellular carrier's switch 24 and resides in close proximately or on-site with cellular switch 24, local calls stay within the carrier's network. Further, customer data is readily accessible by the cellular switch's personnel via a LAN connection or a local dial-up protocol. More importantly, live in-call management is possible to avoid unnecessary credit exposure.

Figure 4:
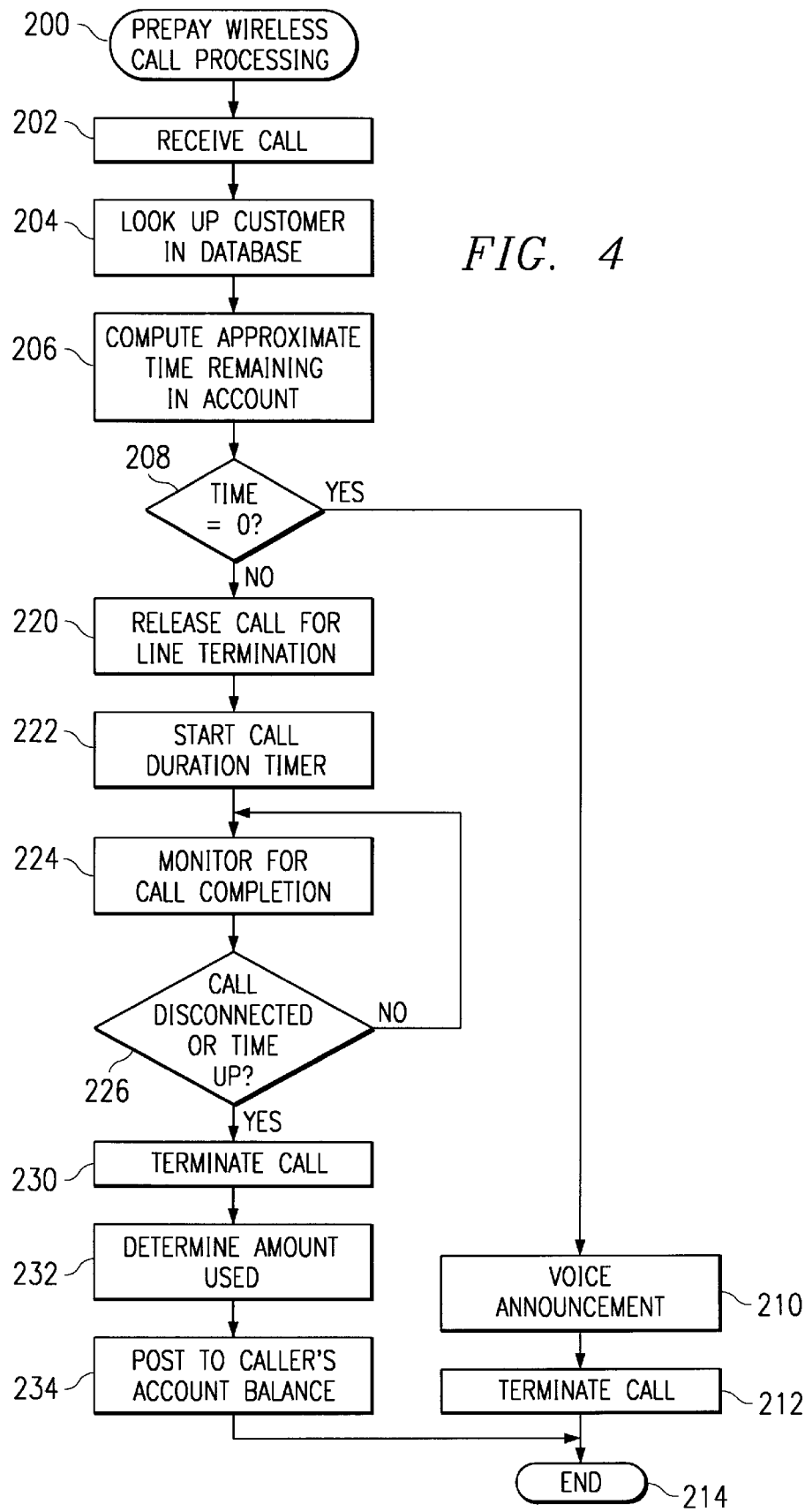
FIG. 4 is a flowchart of an exemplary prepay wireless call processing procedure according to the teachings of the present invention.

FIG. 4 is a flowchart of an exemplary prepay wireless call processing procedure 200 according to is the teachings of the present invention. Referring also to FIG. 3, switch matrix 104 of prepay wireless platform 50 receives a call from cellular switch 24, as shown in block 202. Cellular switch 24 recognizes a prepay wireless call by the MIN, or more specifically, by the customer group office code (NPA-NXX). Prepay wireless customers may be assigned customer group office codes within a predetermined range for ease of recognition.

Upon receiving a call, a database lookup of database 116 is performed to locate the data related to the prepay wireless customer, such as the account balance, as shown in block 204. Call processor 106 then determines the rate per minute the present call is to be charged, which is dependent on whether the call is local or long distance, or the access and air time fees and applicable taxes, etc. From the rate per minute, the amount of time available for the call is computed based on the amount of funds available in the customer's account, as shown in block 206. This computed amount, in number of minutes, for example, is the maximum allowable call duration. If the time is zero, as determined in block 208, then a voice announcement is played by call processor 106 to inform the customer, and the call is disconnected, as shown in blocks 210 and 212. The process then terminates 214.

If, on the other hand, there are sufficient funds left in the account to connect the call, the call is released back to cellular switch 24 for line termination, as shown in block 220. Once the call is released to cellular switch 24, call processor 106 starts a call duration timer, as shown in block 222. Call processor 106 further monitors the call for hardware answer supervision that indicates call completion, as shown in block 224. The call is torn down and disconnected when either of two conditions shown in block 226 becomes true:

1. The call is disconnected at the originating or terminating equipment; or
 2. The call duration timer has reached the computed maximum allowable call duration.

As soon as one of the above conditions is true, the call is disconnected, as shown in block 230. The amount of funds expended by the call is then computed and immediately posted to the customer's account balance stored in databases 116, as shown in blocks 232 and 234. The process then terminates in block 214.

Figure 5:
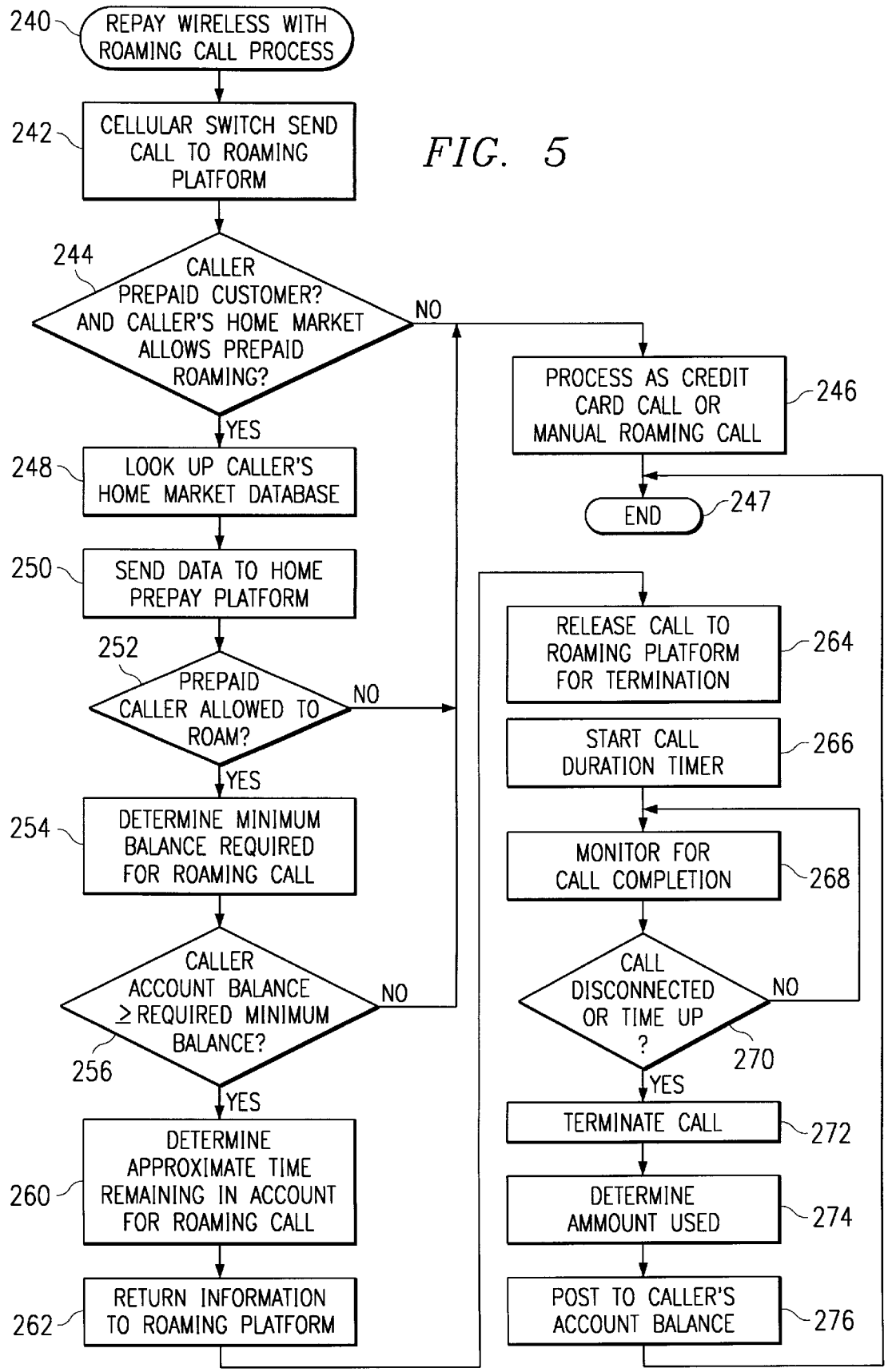
FIG. 5 is a flowchart of an exemplary prepay wireless call processing with roaming according to the teachings of the present invention.

FIG. 5 is a flowchart of an exemplary prepay wireless call processing with roaming 240 according to the teachings of the present invention. Cellular switch 24 transfers the call to a manual or credit card roaming platform 96 after it recognizes the call as unauthorized to roam, as shown in block 242. Roaming platform 96 may be a platform that is on-site with a cellular switch 24, such as an American Roaming Network offered by National Telemanagement Corporation of Dallas, Tex. Roaming platform 96 then performs a database lookup to determine if the NPA-NXX of the caller's MIN is an authorized home carrier prepay area code exchange. Additionally, roaming platform 96 determines whether the roam market or carrier (the wireless carrier serving the caller) allows prepay roaming with the caller's home market or carrier, as shown in block 244. If either condition is not met, then the call is processed as a credit card call or a manual roaming call, as shown in block 246.

If both conditions in block 244 are satisfied, then roaming platform 96 looks up the caller's home market and transfers the call thereto, as shown in block 248. In addition, as shown in block 250, roaming platform 96 sends certain data to the caller's home prepay wireless platform 50, such as the area or location the request for service originates from, and what type of service is requested and the rate for that type of service if the rate is determined by the roam carrier. Typically, the roam carrier dictates both the scope of the local calling area and the long distance rates applicable to calls terminating outside of the local calling area. The caller's home market dictates the access and air time fees charged to the caller while making calls within the roam market.

Once the call is transferred to home prepay wireless platform 50, call processor 106 performs further database lookups to make several determinations. In block 252, call processor 106 determines whether prepay call is allowed to roam. The option to roam in other markets may be flagged in multiple locations, such as a system-wide flag which indicates whether roaming is permitted for any subscriber to that prepay wireless platform 50, and an individual subscriber may be flagged to indicate whether roaming is permitted for that particular subscriber. If either flag indicates that the caller is not allowed to roam, then the call is processed as a credit card or manual roaming call in block 246. If the caller is allowed to roam, then the minimum balance required for the roaming call is computed, as shown in block 254. If the account balance of the caller is not equal to or greater than the minimum balance, the caller cannot roam on the prepay account, and the call is processed as a credit card or manual roaming call in block 246. If there is sufficient funds in the caller's account, then the amount of time available for the roaming call is computed or the maximum allowable call duration, as shown in block 260. This value may be determined by first consulting an established rate table for the roam market and maintained at prepay wireless platform 50. The rate table (not shown) may include information such as the roaming charges delineated by time of day, by call, and/or minutes of use. The call roaming minute rate is thus determined. Further, calling restrictions, if any, are looked up in database 116 and adhered to. The computation for the amount of time available for the call also takes into account any long distance charges and applicable taxes.

Home prepay wireless platform 50 then returns the computed maximum allowable call duration value and any calling restrictions to roaming platform 96, and also releases the call back to the roaming platform's switch for termination, as shown in block 264. A prepay wireless platform co-located with roaming platform 96 then starts a call duration timer and monitors for call termination in blocks 266 and 268. If the call is disconnected at either the originating or terminating equipment or the call duration timer reaches the predetermined maximum allowable call duration received from home prepay wireless platform 50, as determined in block 270, then the call is disconnected in block 272. The amount used up by the call is computed and immediately posted to the caller's account balance stored at home prepay wireless platform 50 to reflect a lower amount, as shown in block 274 and 276. The process then terminates in block 247.

Constructed and operating in this manner, live call management is possible to protect wireless carriers from fraud and calls made on depleted accounts. Further, complete records of all activation and replenishment transactions and details of each call are available to the prepay wireless service administration and the cellular carriers, unlike systems which route prepay calls to remote switches for processing. Prepay wireless customers may activate or replenish their accounts at a comprehensive network of easily accessible locations, which relays the transaction amounts to the account balance databases in real-time. No cumbersome access codes, PINs, and debit cards are required to use the prepay wireless service of the present invention.

Figure 6:
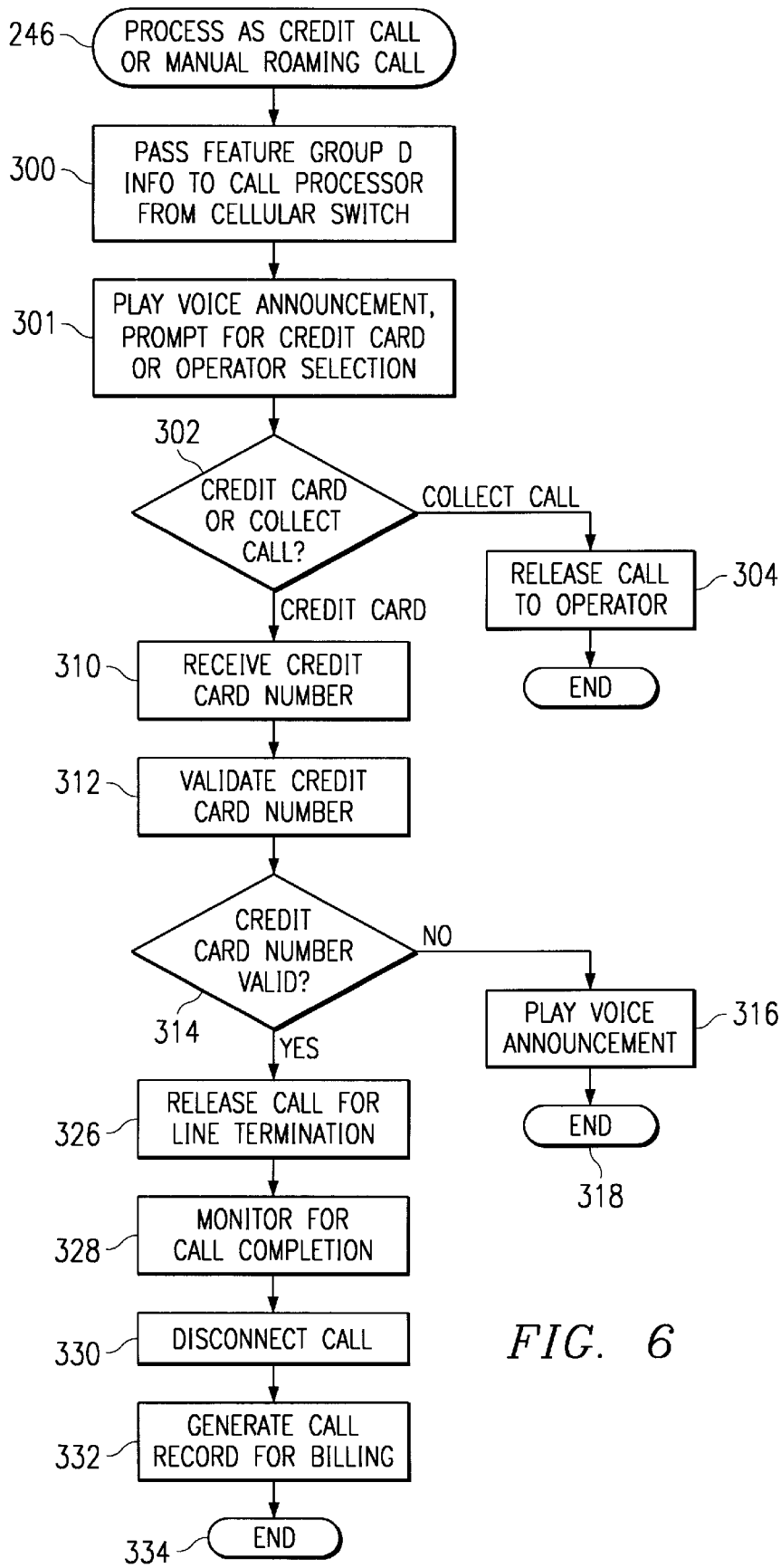
FIG. 6 is a flowchart of an exemplary unregistered roaming call processing according to the teachings of the present invention.

Referring to FIG. 6, a flowchart of an exemplary embodiment of unregistered roaming call processing 246 is shown. If the caller is not a prepaid customer, the caller's home market does not allow prepaid roaming, or the caller's account balance is less than the required minimum balance, as determined in blocks 244 and 256 in FIG. 5, then the call is processed as a credit card call or a manual roaming call. In block 300, the Feature Group D information of the call is passed from cellular switch 24 to call processor 106. Feature Group D includes the caller NPA-NXX or MIN, and the called party number. In block 301, a prerecorded voice announcement is played to provide a number of payment options that the caller may select, such as a credit card call or a collect call. The caller may enter his/her selection by pressing certain number keys as instructed by the voice announcement. If it is a collect call, as determined in block 302, then the call is released to operator 130 for further processing as shown in block 304. Alternatively, means may be provided to allow the caller to announce his/her name, which is recorded and played to the called party. If the called party desires to take the call, the call is connected and billed to the called party.

If the caller selects a credit card call in block 302, then a voice announcement prompts the entry of the credit card number, and the digits are received, as shown in block 310. The credit card number is conveyed to credit card verification company 128, which validates the number and may perform certain fraud detection algorithms, as shown in block 312. For example, a velocity check may detect whether the same credit card number is being used repeatedly with short intervals between usage. A further check may detect that the same credit card number is being charged from a number of different caller NPA-NXX within a short period of time. A call may be denied based on the credit card being invalid or that a detection of possible fraud, as shown in block 314. A voice announcement may alert the caller that the credit card call is denied, as shown in block 316, and the processing ends in block 318. If the credit card number is valid and no fraudulent use is detected, then the call is released back to cellular switch 24 for line termination in block 326, and the call is monitored for completion in block 328. Once the call is disconnected at the originating or terminating equipment, the call is torn down and disconnected in block 330, and a call record is generated for billing purposes in block 332. The process ends in block 334.

Constructed and operating in this manner, unregistered roaming calls are processed on-site with the cellular switch and the prepay wireless platform. The caller need only to enter the credit card number for a credit card call and the call is quickly established without requiring the caller to reenter any other information.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A prepay telecommunications system with unregistered roaming call processing of a prepay customer with a prepay account, comprising:

a home prepay call management platform being coupled to and co-located with a telecommunications carrier switch;

a first customer database coupled to the home prepay call management platform for storing prepay customer data;

a second customer database storing prepay customer roaming data;

a roaming platform being coupled to a second telecommunications carrier switch and the second customer database further in communication with the home prepay call management platform, the roaming platform operable to receive a prepay customer call routed thereto by the second telecommunications carrier, look up the prepay customer roaming data in the second customer database, determine the prepay customer's home prepay call management platform, obtain prepay account data from the home prepay call management platform, route the call back to the second telecommunications carrier for call termination through the roaming platform, perform live monitoring of the call, and disconnect the call mid-call immediately upon detection of depleted prepay account balance; and a credit card verification processor coupled to the prepay call management platform operable to allow prepay account balance replenishing.

2. The prepay telecommunications system, as set forth in claim 1, further comprising a plurality of customer interface facilities coupled to the prepay call management platform for accepting and automatically updating the customer database with prepay customer data.

3. The prepay telecommunications system, as set forth in claim 2, wherein the plurality of customer interface facilities comprises:

a clearinghouse in communication with the prepay call management platform; and a plurality of replenishment units coupled to the clearinghouse for activating a customer prepay account and receiving replenishing funds to a customer prepay account.

4. The prepay telecommunications system, as set forth in claim 2, where the plurality of customer interface facilities each comprises a data card reader for automatically reading deposit cards issued to each customer.

5. The prepay telecommunications system, as set forth in claim 1, further comprising at least one roaming platform being coupled to at least one telecommunications carrier switch and further in communication with the prepay call management platform.

6. The prepay telecommunications system, as set forth in claim 1, further comprising:

additional prepay call management platforms each being coupled to and co-located with a telecommunications carrier switch and being in communications with one another; and at least one roaming platform being coupled to and co-located with at least one telecommunications carrier switch and further in communications with the prepay call management platforms.

7. The prepay telecommunications system, as set forth in claim 1, wherein the prepay call management platform comprises:

a switch matrix coupled to the telecommunications carrier switch for receiving calls therefrom; and a call processor coupled to the switch matrix for monitoring prepay calls and playing pre-recorded voice announcements.

8. The prepay telecommunications system, as set forth in claim 1, wherein the prepay call management platform comprises a call processor coupled to the telecommunications carrier switch for monitoring prepay calls and playing pre-recorded voice announcements.

9. The prepay telecommunications system, as set forth in claim 1, wherein the telecommunications carrier switch is a wireless switch.

10. The prepay telecommunications system, as set forth in claim 1, wherein the prepay call management platform includes a call duration timer for determining when a maximum allowable call duration for a prepay call has lapsed.

11. The prepay telecommunications system, as set forth in claim 1, further comprising:

a first router coupled to the prepay call management platform;

a second router coupled to the first router via a communications network; and the credit card verification processor being coupled to the second router.

12. A method for live call management of a prepay call with roaming call processing, comprising the steps of:

recognizing a roaming call at a telecommunications carrier switch;

routing the roaming call to a prepay call management platform coupled to the telecommunications carrier switch;

identifying a home prepay call management platform associated with the roaming call;

obtaining prepay account data associated with the roaming call from the home prepay call management platform;

routing the roaming call to the telecommunications carrier switch for line termination;

monitoring the prepay call; and disconnecting the call immediately in response to depletion of prepay account balance.

13. The method, as set forth in claim 12, further comprising the steps of:

recognizing an unregistered roaming call at the telecommunications carrier switch;

announcing payment options including a credit card call and collect call options in response of recognizing an unregistered roaming call at the telecommunications carrier switch;

receiving a call option selection; and prompting for a credit card number in response to a selection of a credit card call.

14. The method, as set forth in claim 13, wherein the verifying step comprises the steps of:

conveying the credit card number to the credit card verification processor; and validating the credit card number.

15. The method, as set forth in claim 13, wherein the verifying step further comprises the step of checking for fraudulent use of the credit card number.

16. The method, as set forth in claim 13, wherein the step of announcing payment options and prompting for a selection comprises the steps of:

announcing a credit card call and collect call options;

receiving a call option selection; and prompting for a caller identity in response to a selection of a collect call option.

17. The method, as set forth in claim 13, wherein the step of recognizing an unregistered roaming call comprises the step of not recognizing a mobile identification number associated with the call.

18. The method, as set forth in claim 13, wherein the step of recognizing an unregistered roaming call comprises the step of determining a customer group office code of a mobile identification number associated with the call not being within a predetermined range.

19. A method for live call management of a prepay call with roaming call processing, comprising the steps of:

recognizing a roaming call at a telecommunications carrier switch;

routing the roaming call to a roaming call management platform coupled to the telecommunications carrier switch;

identifying a home prepay call management platform associated with the roaming call;

obtaining prepay account data associated with the roaming call from the home prepay call management platform;

determining the maximum allowable call duration as indicated by the prepay account data;

routing the roaming call to the telecommunications carrier switch through the roaming call management platform for line termination;

starting a call duration timer;

monitoring the prepay call for the call duration timer reaching the maximum allowable call duration;

disconnecting the call immediately in response to the call duration timer reaching the maximum allowable call duration; and updating the prepay account data at the home prepay call management platform to reflect the decreased balance.

* * * * *